(12) United States Patent
Zhang

(10) Patent No.: US 8,907,805 B2
(45) Date of Patent: Dec. 9, 2014

(54) METHOD FOR SENSING CONNECTION PORT, CONNECTION PORT SENSING APPARATUS AND COMPUTER SYSTEM USING THE SAME

(75) Inventor: Qing Zhang, Kunshan (CN)

(73) Assignee: Wistron Corp., New Taipei (TW)

( * ) Notice: Subject to any disclaimer, the term of this patent is extended or adjusted under 35 U.S.C. 154(b) by 183 days.

(21) Appl. No.: 13/556,376

(22) Filed: Jul. 24, 2012

(65) Prior Publication Data

US 2013/0249701 A1    Sep. 26, 2013

(30) Foreign Application Priority Data

Mar. 22, 2012    (CN) .................. 2012 2 0112094 U

(51) Int. Cl.
*G08B 21/00*    (2006.01)

(52) U.S. Cl.
USPC ............... 340/686.6; 340/539.11; 340/539.23

(58) Field of Classification Search
USPC ............... 340/686.6, 539.11, 539.22, 539.23, 340/573.1, 573.4, 815.4, 539.1, 505; 710/14, 15, 303, 305, 306, 315

See application file for complete search history.

(56) References Cited

U.S. PATENT DOCUMENTS

| | | | |
|---|---|---|---|
| 6,825,764 B2 * | 11/2004 | Capobianco et al. .... 340/539.23 |
| 7,291,032 B1 * | 11/2007 | Carver et al. ................. 439/310 |
| 7,898,397 B2 * | 3/2011 | Kerr et al. ................. 340/407.2 |
| 7,921,235 B2 * | 4/2011 | Best et al. ....................... 710/15 |
| 2005/0215110 A1 * | 9/2005 | Chen .............................. 439/502 |
| 2006/0044148 A1 * | 3/2006 | Daniels et al. ............. 340/686.1 |
| 2011/0012727 A1 * | 1/2011 | Pance et al. .................... 340/505 |

* cited by examiner

*Primary Examiner* — Hung T. Nguyen

(74) *Attorney, Agent, or Firm* — Li & Cai Intellectual Property (USA) Office

(57) ABSTRACT

The present disclosure relates to a method for sensing a connection port and a connection port sensing apparatus thereof. The method includes the steps of: providing a sensing device nearing a connection port; providing a lighting device nearing the connection port; lighting the lighting device by a connection port sensing apparatus when the sensing device detects that an object is nearing the connection port, concurrently, displaying a message through the operating system to notify the user of the corresponding information about the connection port.

17 Claims, 4 Drawing Sheets

METHOD FOR SENSING CONNECTION PORT, CONNECTION PORT SENSING APPARATUS AND COMPUTER SYSTEM USING THE SAME

BACKGROUND

1. Technical Field

The present disclosure relates to a cable technology, in particular, to a method for sensing connection port and the connection port using the same.

2. Description of Related Art

As electronic devices have been evolved to be thin and light weighted, users has getting used to carry electronic devices around. Commonly seen electronic devices such as cellular phones, personal digital assistances (PDA), notebooks, tablets, digital cameras, digital camcorder, and etc. have been used widely used by publics, and becoming an indispensable part of modern life.

In general, computer systems such as personal computers, laptops, notebooks or other similar computers are equipped with Universal Serial Bus (USB) port, network connection ports, and even equipped with connection ports of HDMI or D-SUB for connecting other devices.

Nevertheless, the connection ports in practice are placed at the back of the personal computers, laptops, notebooks. Moreover, in general to find the corresponding connection port, the user often has to use hand to touch or turn the computer around to look for the appropriate connection port however, either method is very inconvenient. Further, it is also very inconvenient to connect the device into the corresponding ports when there is insufficient light or at night, as user must find by hand or a light device is required.

SUMMARY

An exemplary embodiment of the present disclosure provides a method for sensing a connection port which may actively light the connection ports as well as provide a message to facilitate a user inserting an external device into the corresponding connection port.

An exemplary embodiment of the present disclosure provides a connection port sensing apparatus which may actively light a connection port as well as provide a message to facilitate a user inserting an external device into the corresponding connection port.

To achieve the aforementioned objectives of the present disclosure, the present disclosure provides a method for sensing a connection port, adapted for a computer system. The method for sensing connection port includes the following steps. Provides a sensing device nearing a connection port. Provides a lighting device nearing the connection port. When the sensing device detects that an object is nearing the connection port, activates the lighting device to light the connection port. An operating system of the computer system issues a message for indicating the type of connector and the associated insertion direction.

To achieve the aforementioned objectives of the present disclosure, the present disclosure provides a connection port sensing device, adapted nearby a connection port of a computer system. The connection port sensing apparatus includes a sensing device and a lighting device. The sensing device is arranged nearby the connection port and is used for detecting whether or not an object is nearing the connection port. The lighting device is arranged nearby the connection port and is used for lighting the connection port. When the sensing device detects that the object is nearing the connection port, the connection port sensing apparatus activates the lighting device to light the connection port to facilitate a user inserting an external an external device e.g., equipped with a USB port into the corresponding connection port. Meanwhile, an operating system of the computer system may also display a message in corresponding to the connection port on a screen enabling the user easily viewing the type of the current connection port, insertion direction or related explanation.

To achieve the aforementioned objectives of the present disclosure, the present disclosure further provides a computer system. The computer system includes a plurality of connection ports and a connection port sensing apparatus. The connection port sensing apparatus includes a sensing device and a lighting device. The connection port sensing apparatus is arranged nearby at least one of the connection ports for lighting and providing information related to the connection port. When the sensing device detects that an object is nearing the connection port, e.g., when the finger of the user is nearing the connection port, the connection port sensing apparatus activate the lighting device to light the connection port so to facilitate the user in finding the corresponding connection port. In addition, the operating system of the computer system may at same time issues a message to inform the user information related to the connection port that has been touched when detects that the finger of the user is nearing the connection ports.

The spirit of the present disclosure is adding a sensing device and a lighting device nearing the connection port. When the finger has touched the sensing device placed nearby the connection port, the operating system may provide information related to the type of the connection ports and the corresponding insertion direction. When insufficient light is presented, as long as the finger has touched the sensing device placed nearby the connection port, the operating system may provide information related to the type of the connection port and the inserting direction while activate the lighting device at same time. Thus the user can easily insert the external device into the corresponding connection port.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
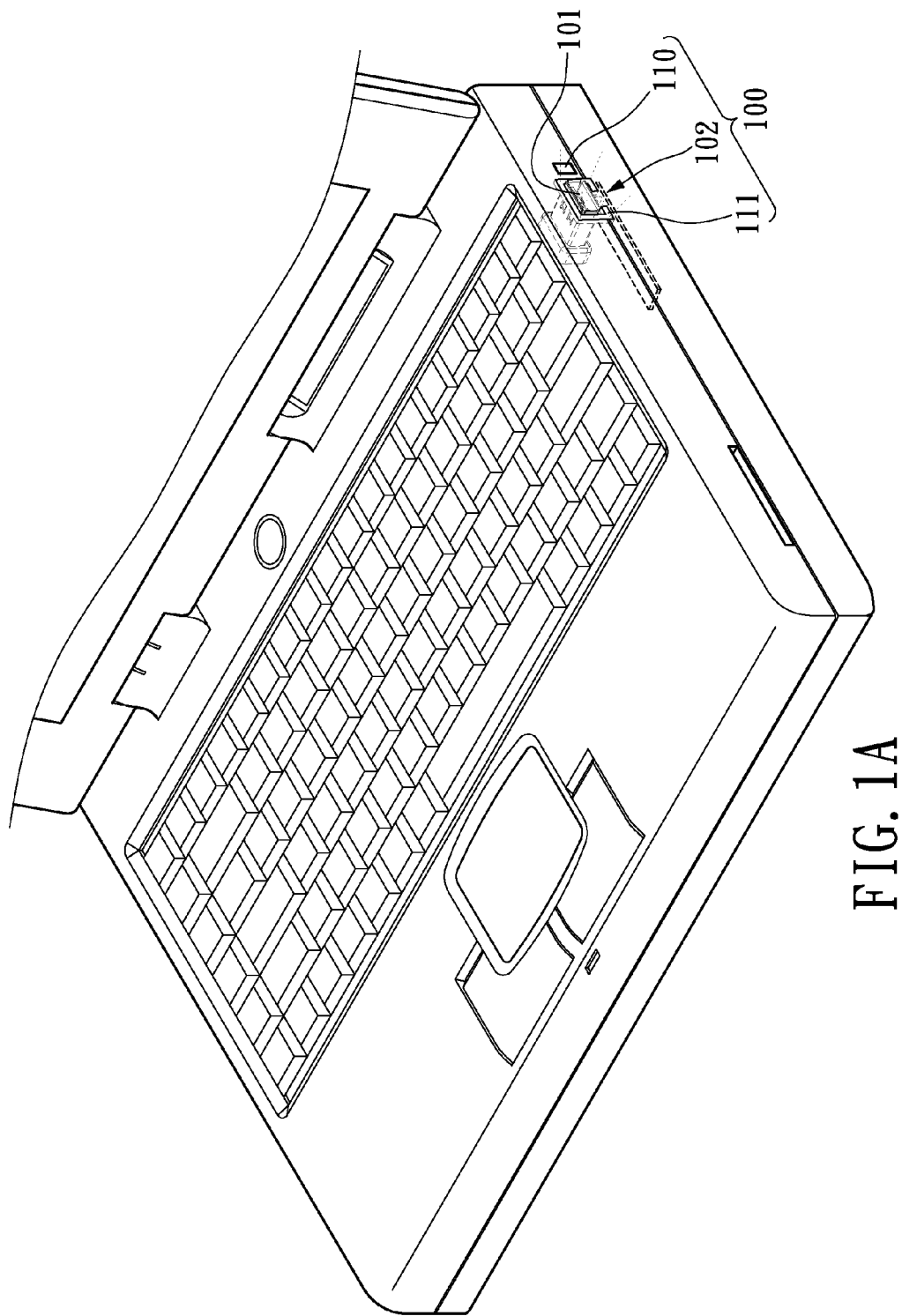
FIG. 1A is an exemplary diagram illustrating a computer system in accordance to the first exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

First Exemplary Embodiment

Figure 1B:
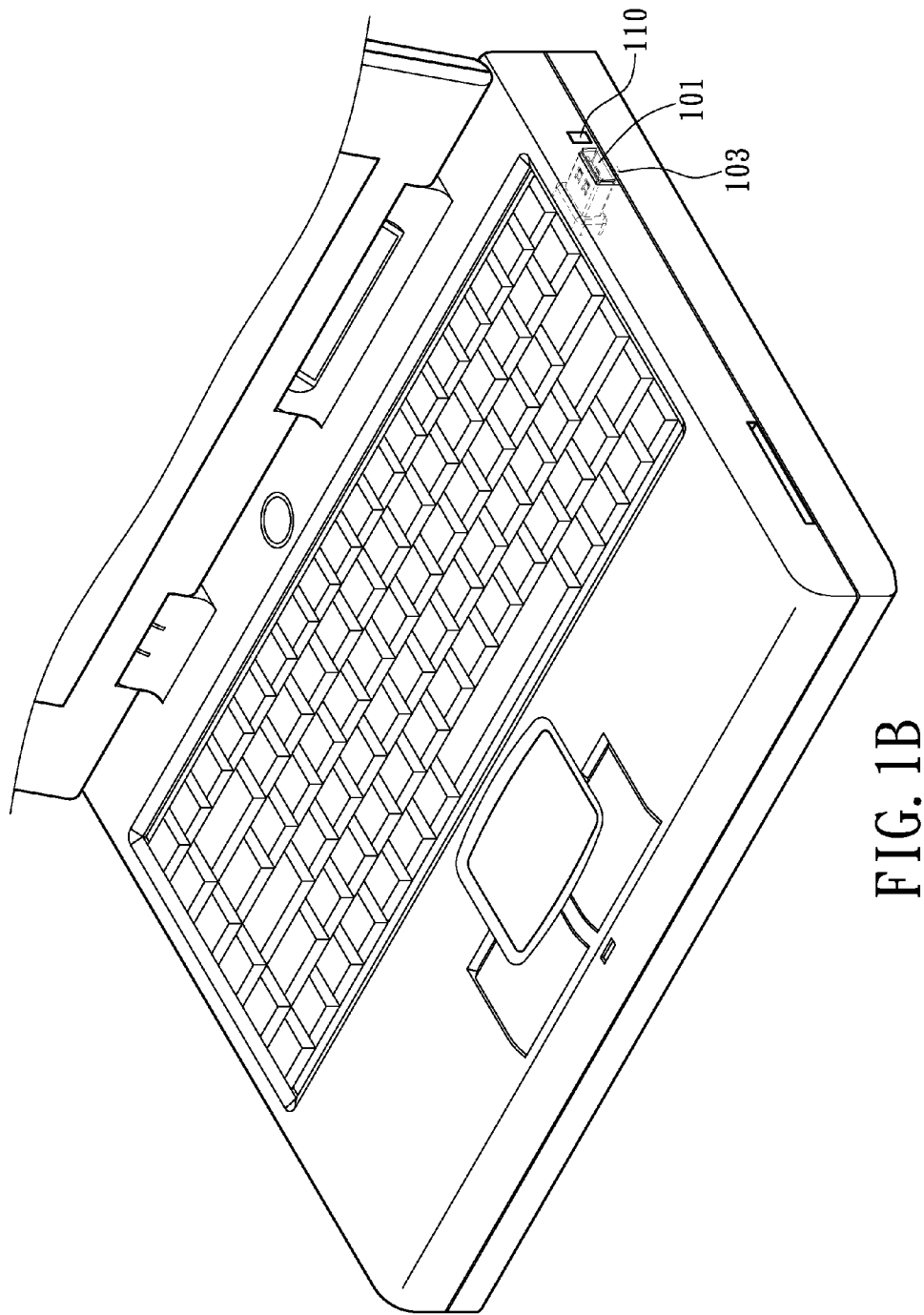
FIG. 1B is another exemplary diagram illustrating the computer system in accordance to the first exemplary embodiment of the present disclosure.

FIG. 1A is an exemplary diagram illustrating a computer system in accordance with the first exemplary embodiment of the present disclosure. FIG. 1B is another exemplary diagram illustrating the computer system in accordance to the first exemplary embodiment of the present disclosure. Please refer to FIG. 1A and FIG. 1B. The computer system herein uses a notebook as an example. The notebook includes at least a connection port 101. A connection port sensing apparatus 100 is arranged nearby the connection port 101. The connection port sensing apparatus 100 includes a lighting device 102 and a sensing device 110. The sensing device 110 and the lighting device 102 respectively disposed around the connection ports. The lighting device 102 may be formed of a lighting emitting diode and a light guiding structure 111 (e.g., light guiding plate), for lighting the connection port 101. The sensing device 110 may for example be a touch button or an infrared sensor for sensing whether or not the user has touched the connection port 101 via finger. When the sensing device 110 senses that the user has touched nearing the connection port 110, the connection port sensing apparatus 100 may activate the lighting device 102 for lighting the connection port 101. In addition, the computer system may at same time display a message corresponds to the connection port 101 on a screen, wherein the message may include the types of the connector and configuration settings of the message e.g., brightness of the LED, window popup time, sensitivity of the port and so on.

In order to facilitate the explanation, the instant embodiment takes the most commonly seen Universal Serial Bus (USB) port as an illustration example. The primary difference between FIG. 1A and FIG. 1B is in the lighting devices 102 and 103. In FIG. 1A, the lighting device 102 placed nearing the connection port 101 has a light guiding structure 111 surrounding the connection port 101 for increase lighting effect. On the other hand, in FIG. 1B, the lighting device 103 placed nearing the connection port 101 is a light point source e.g., a LED. It is worth to note that the present disclosure does not limit the appearance structure and lighting component associated with the lighting device 102 and 103.

Figure 2:
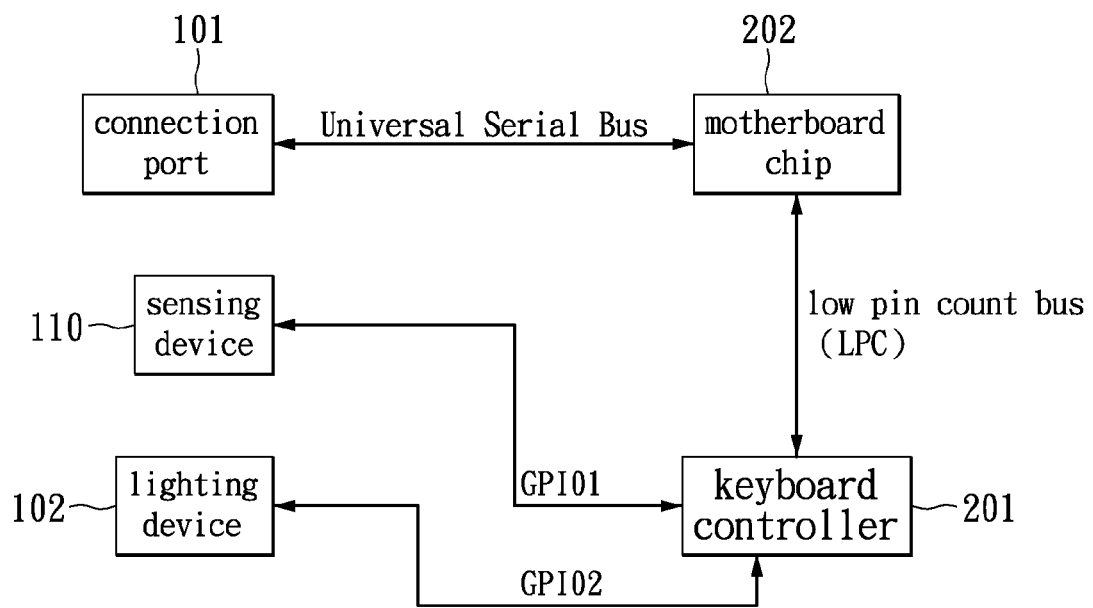
FIG. 2 is a block diagram illustrating the computer system in accordance to the first exemplary embodiment of the present disclosure.

The sensing device 110 and lighting device 102 of the connection port sensing apparatus 100 may be controlled via a microcontroller, further may even be integrated into a motherboard controlled by the microcontroller on the motherboard and communicate with the operation system through the microcontroller. Please refer to FIG. 2, which illustrates a block diagram describing the computer system in accordance to the first exemplary embodiment of the present disclosure. Please refer to FIG. 2 in conjunction with FIG. 1. The disclosed computer system may include a keyboard controller 201 and a motherboard chip 202. The motherboard chip 202 may for instance be a Platform Controller Hub (PCH) chip of the newest technology or a Fusion Controller Hub (FCH) chip. The motherboard chip 202 has a Low Pin Count (LPC) bus and a Universal Serial Bus (USB) bus. The motherboard chip 202 may couple to the keyboard controller 201 through the LPC bus LPC and the motherboard chip may also couple to the USB port 101 through the USB bus USB.

The keyboard controller 201 has a first general purpose input output (GPIO) pin GPIO1 and a second general purpose input output pin GPIO2. The general purpose input output pins GPIO1, GPIO1 are coupled to the sensing device 110 and the lighting device 102, respectively. The sensing device 110 and the lighting device 102 in the first exemplary embodiment are placed nearby the USB port 101.

The sensing device 110 may through a first general purpose input output GPIO1 notify the keyboard controller 201, when an object is detected nearing the USB port 101. The keyboard controller 201 may control the lighting operation of the lighting device 101 though the second general purpose input output pin GPIO2. Subsequently, the keyboard controller 201 may notify the motherboard chip 201 through the LPC bus LPC. Therefore, the internal application of the operating system may receive the notification of "An object being nearing the USB port 101". Consequently, the working area of the operating system may pop up instructions showing the relating information for the USB port 101. Thus the user may clearly know the type of the connection port of current insertion as well as the insertion direction while providing illumination for helping the user inserting the external device e.g., a flash drive or a connector. It is worth noting that the messaging functionality of the operating system may be activated or deactivated according to the user's need, further the displayed item and the associated displaying method e.g., display timing, position, and type of connection port 101 or insertion direction may also be configured according to the user's need.

Moreover, the user may deactivate the port sensing functionality of the computer system when there is sufficient light presented so that the connection port sensing apparatus 100 may not actively provide lighting and messaging functionalities.

The sensing device 110 may be placed close to the connection port 101 or integrated on the housing of the connection port 101 so that the sensing signal may be instantly generated to notify the computer system once the user has touched the connection port 101. The computer system may activate the lighting device 102 and provide the corresponding message. In addition, it is worth to note that in another exemplary embodiment of the present disclosure, the sensing device 110 may directly control the lighting device 102. When the sensing device 110 detects that the user has touched the connection port 101, the lighting device 102 may be directly controlled to light the connection port 101 for a period of time thereby facilitate the user in inserting the external device.

Even though the aforementioned first exemplary embodiment uses the USB port as an example, however those skilled in the art should know that all the connection ports including but not limited to D-SUB, DVI, HDMI, RJ45, RS-232, PS2 may utilize the present disclosure to indicate the place of the corresponding port to avoid occurrence of improper insertion.

Moreover, though the aforementioned exemplary embodiment uses keyboard controller and motherboard chip as illustration examples, however, those skilled in the art should know the keyboard controller may be replaced by an embedded controller and further there are various chips on the motherboard that may use as the motherboard chip. Consequently, the present disclosure should not be limited to the described structure of the keyboard controller and motherboard. The associated limitations should be inferred to the actual scope of the claim and further descriptions are therefore omitted.

In addition, even though the aforementioned embodiment uses the low pin count bus, the general purpose input output pin as illustration examples, however, those skilled in the art should know that actual pins and bus line configuration may vary according the chip adopted, thus the present disclosure is not limited thereto.

The Second Exemplary Embodiment

Figure 3:
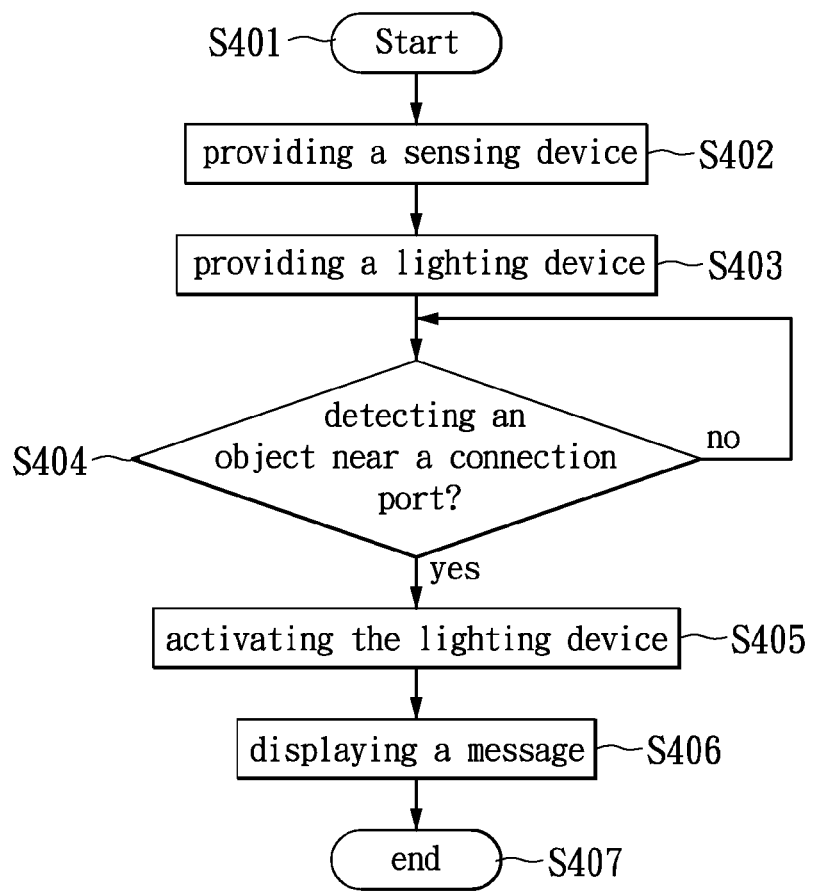
FIG. 3 is a flow chart diagram illustrating a method for sensing connection port in accordance to the second exemplary embodiment of the present disclosure.

A method for sensing a connection port may be generalized based on the aforementioned first exemplary embodiment. FIG. 3 is a flow chart diagram illustrating a method for sensing a connection port in accordance to the second exemplary embodiment of the present disclosure. Please refer to FIG. 3, the method for sensing the connection port may be used in a computer system. The method for sensing the connection port includes the following steps:

Step S401: start

Step S402: providing a sensing device nearing a connection port.

Step S403: providing a lighting device nearing the connection port.

Step S404: determining whether or not an object is nearing the connection port? When the object is detected nearing the connection port by the sensing device, executes Step S405, otherwise returns to Step S404.

Step S405: activating the lighting device to light the connection port

Step S406: displaying a message on a screen of the computer system having an operating system indicating the type of connection port and the associated insertion direction.

Step S407: end

In summary, the spirit of the present disclosure mainly is adding a sensing device and a lighting device nearing the connection ports. When the finger has touched the sensing device placed nearby the connection ports, the operating system may provide information related to the type of the connection ports and the corresponding insertion direction. When insufficient light is presented, as long as the finger has touched the sensing device placed nearby the connection ports, the operating system may provide information related to the type of the connection port and the insertion direction while activate the lighting device at same time. Thus the user can easily insert the external device into the corresponding connection ports.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for sensing a connection port, adapted for a computer system, the method comprising:
providing a sensing device nearing a connection port;
providing a lighting device nearing the connection port; and
activating the lighting device by a connection port sensing apparatus when the sensing device detects an object being nearing the connection port to light the connection port to facilitate an external device into the connection port;
wherein the computer system further comprises:
a keyboard controller having a first general purpose input output pin and a second general purpose input output pin, wherein the first general purpose input output pin is coupled to the sensing device and the second general purpose input output pin is coupled to the lighting device;
a motherboard chip having a low pin count bus and a specific bus, wherein the motherboard chip is coupled to the keyboard controller through the low pin count bus and the motherboard chip is coupled to the port of the connection port through the specific bus,
when the keyboard controller determines that the sensing device detects the object being nearing the connection port through the first general purpose input output pin;
the keyboard controller notifying the motherboard chip through the low pin count bus, while the motherboard chip displaying a message on a screen through the operating system of the computer system; and
the keyboard controller controls the operation of the lighting device through the second general purpose input output pin.

2. The method for sensing a connection port according to claim 1, further comprising:
displaying a message in corresponding to the connection port on a screen of the computer system, when the sensing device detects that the object is nearing the connection port.

3. The method for sensing a connection port according to claim 1, wherein the connection port is a universal serial bus port.

4. The method for sensing a connection port according to claim 1, wherein the lighting device is a linear lighting device surrounding the connection port.

5. The method for sensing a connection port according to claim 1, wherein the lighting device is a light emitting diode.

6. The method for sensing a connection port according to claim 1, wherein the sensing device is a touch button or an infrared sensor.

7. A connection port sensing apparatus, for a computer system having at least a connection port, the connection port sensing apparatus comprising:
a sensing device, arranged nearby the connection port, for detecting whether or not an object is nearing the connection port; and
a lighting device, arranged nearby the connection port, for lighting the connection port;
wherein the connection port sensing apparatus activates the lighting device to light the connection port to facilitate an external device into the connection port when the sensing device detects that the object is nearing the connection port;
wherein the computer system comprises a keyboard controller and a motherboard chip, wherein the sensing device is coupled to a first general purpose input output pin of the keyboard controller and the lighting device is coupled to a second general purpose input output pin of the keyboard controller; the connection port being coupled to a specific bus of the motherboard chip, wherein the keyboard controller determines that the sensing device detects the object being nearing the connection port through the first general purpose input output pin;
the keyboard controller notifying the motherboard chip through a low pin count bus, to have the motherboard chip through an operating system of the computer system issuing a message; and the keyboard controller controls the operation of the lighting device through the second general purpose input output pin.

8. The connection port sensing apparatus according to claim 7, wherein the connection port sensing apparatus displays a message in corresponding to the connection port on a screen of the computer system when the sensing device detects that the object is nearing the connection port.

9. The connection port sensing apparatus according to claim 7, wherein the connection board is a universal serial bus port.

10. The connection port sensing apparatus according to claim 7, wherein the lighting device is a linear lighting device surrounding the connection port.

11. The connection port sensing apparatus according to claim 7, wherein the lighting device is a light emitting diode.

12. The connection port sensing apparatus according to claim 7, wherein the sensing device is a touch button or an infrared sensor.

13. A computer system, comprising:
a computer, having at least a connection port; and
a connection port sensing apparatus, arranged nearby the connection port, for lighting the connection port, the connection port sensing apparatus comprising:
a sensing device, arranged nearby the connection port, for detecting whether or not an object is nearing the connection port; and
a lighting device, arranged nearby the connection port, for lighting the connection port;
wherein the connection port sensing apparatus activates the lighting device to light the connection port to facilitate an external device into the connection port when the sensing device detects that the object is nearing the connection port;
wherein the computer system comprises a keyboard controller and a motherboard chip, wherein the sensing device is coupled to a first general purpose input output pin of the keyboard controller and the lighting device is coupled to a second general purpose input output pin of the keyboard controller; the connection port being coupled to a specific bus of the motherboard chip, wherein the keyboard controller determines that the sensing device detects the object being nearing the connection port through the first general purpose input output pin;
the keyboard controller notifying the motherboard chip through a low pin count bus, and the motherboard chip operating to have an operating system of the computer system issuing a message; and
the keyboard controller controls the operation of the lighting device through the second general purpose input output pin.

14. The computer system according to claim 13, wherein the connection port sensing apparatus displays a message in corresponding to the connection port on a screen of the computer system when the sensing device detects that the object is nearing the connection port.

15. The computer system according to claim 13, wherein the connection board is a universal serial bus port.

16. The computer system according to claim 13, wherein the lighting device is a linear lighting device surrounding the connection port.

17. The computer system according to claim 13, wherein the sensing device is a touch button or an infrared sensor.

* * * * *